US011120624B2

(12) United States Patent
Lee et al.

(10) Patent No.: US 11,120,624 B2
(45) Date of Patent: Sep. 14, 2021

(54) THREE-DIMENSIONAL HEAD PORTRAIT GENERATING METHOD AND ELECTRONIC DEVICE

(71) Applicant: ASUSTeK COMPUTER INC., Taipei (TW)

(72) Inventors: Guan-De Lee, Taipei (TW); Hao-Yuan Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/414,974

(22) Filed: May 17, 2019

(65) Prior Publication Data

US 2019/0362547 A1 Nov. 28, 2019

(30) Foreign Application Priority Data

May 23, 2018 (CN) .......................... 201810502084.7

(51) Int. Cl.
| | |
|---|---|
| *G06T 17/20* | (2006.01) |
| *G06T 7/521* | (2017.01) |
| *G06T 15/04* | (2011.01) |

(52) U.S. Cl.
CPC .............. *G06T 17/20* (2013.01); *G06T 7/521* (2017.01); *G06T 15/04* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,991,110 B2* | 4/2021 | Yan | ......................... G06T 11/00 |
| 2006/0067573 A1* | 3/2006 | Parr | ......................... G06K 9/00 |
| | | | 382/154 |
| 2010/0215255 A1* | 8/2010 | Xiao | ...................... G06K 9/621 |
| | | | 382/159 |
| 2016/0148425 A1* | 5/2016 | Hwang | .............. G06K 9/00281 |
| | | | 345/419 |

(Continued)

FOREIGN PATENT DOCUMENTS

| | | |
|---|---|---|
| CN | 104376599 A | 2/2015 |
| CN | 104915981 A | 9/2015 |
| CN | 106910247 A | 6/2017 |

*Primary Examiner* — Jeffrey J Chow
(74) *Attorney, Agent, or Firm* — McClure, Qualey & Rodack, LLP

(57) ABSTRACT

A three-dimensional head portrait generating method executes on an electronic device. The three-dimensional head portrait generating method establishes a three-dimensional head portrait model with a plurality of feature points according to front face information, wherein feature points form a plurality of first grids on the three-dimensional head portrait model; maps a first part of the feature points of the three-dimensional head portrait model to a left face image to form a plurality of second grids on the left face image; maps a second part of the feature points of the three-dimensional head portrait model to a right face image to form a plurality of third grids on the right face image; and superimposes the left face image and the right face image onto the three-dimensional head portrait model according to a correspondence among the first grids, the second grids and the third grids, to generate a three-dimensional head portrait.

17 Claims, 18 Drawing Sheets

(56) References Cited

U.S. PATENT DOCUMENTS

| | | | |
|---|---|---|---|
| 2017/0018088 A1* | 1/2017 | Jeong | G06T 15/205 |
| 2017/0212661 A1* | 7/2017 | Ito | G06F 3/0482 |
| 2017/0345183 A1* | 11/2017 | Chen | G06T 7/55 |
| 2018/0005018 A1* | 1/2018 | Young | G06K 9/00228 |
| 2019/0035149 A1* | 1/2019 | Chen | G06T 13/40 |
| 2020/0258206 A1* | 8/2020 | Shen | G06T 7/55 |

* cited by examiner

THREE-DIMENSIONAL HEAD PORTRAIT GENERATING METHOD AND ELECTRONIC DEVICE

CROSS-REFERENCE TO RELATED APPLICATION

This application claims the priority benefit of China Application Serial No. 201810502084.7, filed on May 23, 2018. The entirety of the above-mentioned patent application is hereby incorporated by reference herein and made a part of the specification.

BACKGROUND OF THE INVENTION

Field of the Invention

The invention relates to a three-dimensional imaging technology and, more particularly, to a three-dimensional head portrait generating method and an electronic device.

Description of the Related Art

In the modern era where network communication is prevalent, a head portrait is a graph representative of the identity of a user. However, in the past, head portraits were mostly flat photos, and a user could not create a virtual self to jump on a screen.

In recent years, with the advancement and development of computer graphics and calculator vision technologies, an image construction technology has gradually developed into a three-dimensional imaging technology from an original two-dimensional imaging technology to meet visual needs of people. Generally speaking, when a three-dimensional head portrait of a user is constructed, a scanning instrument first scans the user's face. However, traditional scanning bases are relatively large, or require assistance from others to stably move the scanning instrument to complete scanning, and thus it takes a lot of time to complete scanning. In addition, general three-dimensional head portraits use pre-established head portrait models, and users cannot establish their own head portrait models.

BRIEF SUMMARY OF THE INVENTION

According to the first aspect of the disclosure, a three-dimensional head portrait generating method applied to an electronic device is provided herein. The three-dimensional head portrait generating method comprises: establishing a three-dimensional head portrait model with a plurality of feature points according to front face information, wherein the feature points form a plurality of first grids on the three-dimensional head portrait model; mapping a first part of the feature points of the three-dimensional head portrait model to a left face image to form a plurality of second grids on the left face image; mapping a second part of the feature points of the three-dimensional head portrait model to a right face image to form a plurality of third grids on the right face image; and superimposing the left face image and the right face image onto the three-dimensional head portrait model according to a correspondence among the first grids, the second grids and the third grids, to generate a three-dimensional head portrait.

According to the second aspect of the disclosure, an electronic device is provided herein. The electronic device includes: an image capture unit, capturing a left face image and a right face image; and a processing unit, establishing a three-dimensional head portrait model with a plurality of feature points according to front face information, wherein the feature points form a plurality of first grids on the three-dimensional head portrait model, the processing unit maps a first part of the feature points of the three-dimensional head portrait model to the left face image to form a plurality of second grids on the left face image, the processing unit maps a second part of the feature points of the three-dimensional head portrait model to the right face image to form a plurality of third grids on the right face image, and the processing unit combines the left face image and the right face image onto the three-dimensional head portrait model according to a correspondence between the first grids, the second grids and the third grids, to generate a three-dimensional head portrait.

According to the third aspect of the disclosure, a non-transitory computer readable storage medium, storing a plurality of program codes is provided herein. When the program codes are loaded on an electronic device, the electronic device performs the following steps: establishing a three-dimensional head portrait model with a plurality of feature points according to front face information, wherein the feature points form a plurality of first grids on the three-dimensional head portrait model; mapping a first part of the feature points of the three-dimensional head portrait model to a left face image to form a plurality of second grids on the left face image; mapping a second part of the feature points of the three-dimensional head portrait model to a right face image to form a plurality of third grids on the right face image; and superimposing the left face image and the right face image onto the three-dimensional head portrait model according to a correspondence among the first grids, the second grids and the third grids, to generate a three-dimensional head portrait.

The detailed descriptions of other effects and embodiments of the invention are provided below with reference to the accompanying drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Figure 22:
FIG. 22 is a schematic view of an example of a three-dimensional head portrait.

Referring to FIG. 1 to FIG. 3 and FIG. 22, a three-dimensional head portrait generating method according to any embodiment of the disclosure is applied to an electronic device 100, so that the electronic device 100 simply and quickly generates a real three-dimensional head portrait 51 that is almost the same as a user (referring to FIG. 22).

The electronic device 100 includes a processing unit 110, a projection unit 120, a sensing unit 130, an image capture unit 140, and a display unit 150. Moreover, the processing unit 110 is coupled to the projection unit 120, the sensing unit 130, the image capture unit 140, and the display unit 150.

The processing unit 110 enables the projection unit 120 to project radiant light on a user's face U1 (step S11) and enables the sensing unit 130 to sense reflected light corresponding to the radiant light and reflected from the user's face U1 (step S12), thereby calculating front face information about depth information of the user's face U1 according to the reflected light sensed by the sensing unit 130 (step S13).

In some embodiments, the projection unit 120 is implemented by using one or more suitable radiation sources, such as diode lasers and light emitting diodes. The radiant light projected by the projection unit 120 is structured light. In addition, the radiant light projected by the projection unit 120 is invisible light. In some other embodiments, the radiant light projected by the projection unit 120 is visible light.

In some embodiments, the sensing unit 130 is any light sensor corresponding to the projection unit 120. In an embodiment, when the radiant light projected by the projection unit 120 is infrared light, the sensing unit 130 is an infrared light camera.

Figure 1:
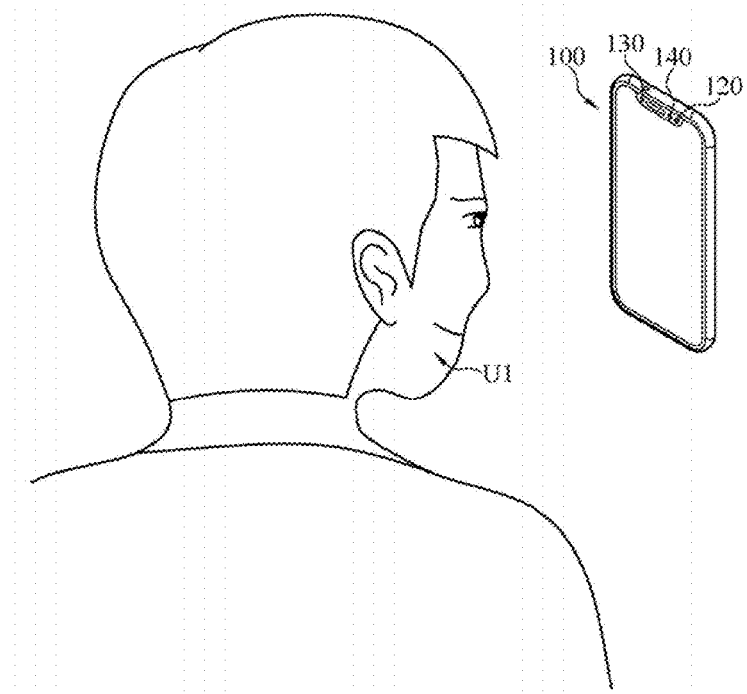
FIG. 1 is a schematic overview of an embodiment where a user uses an electronic device.
Figure 2:
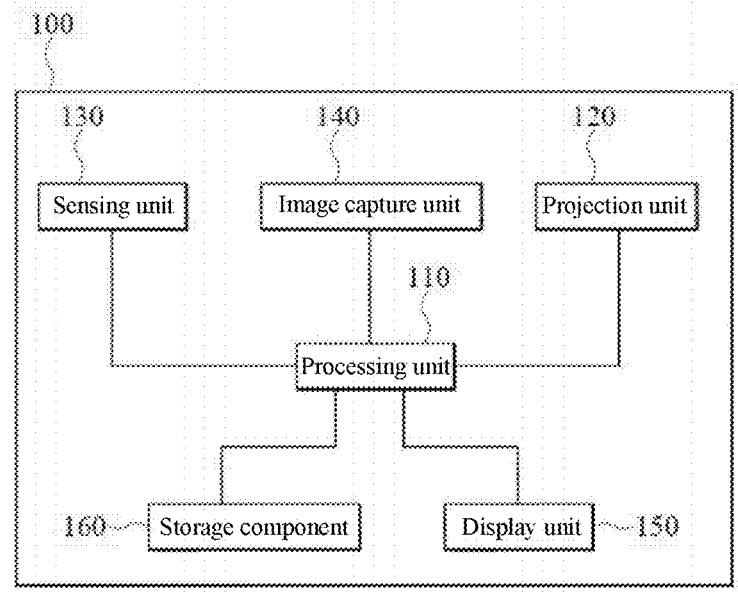
FIG. 2 is a schematic block overview of an embodiment of an electronic device.
Figure 3:
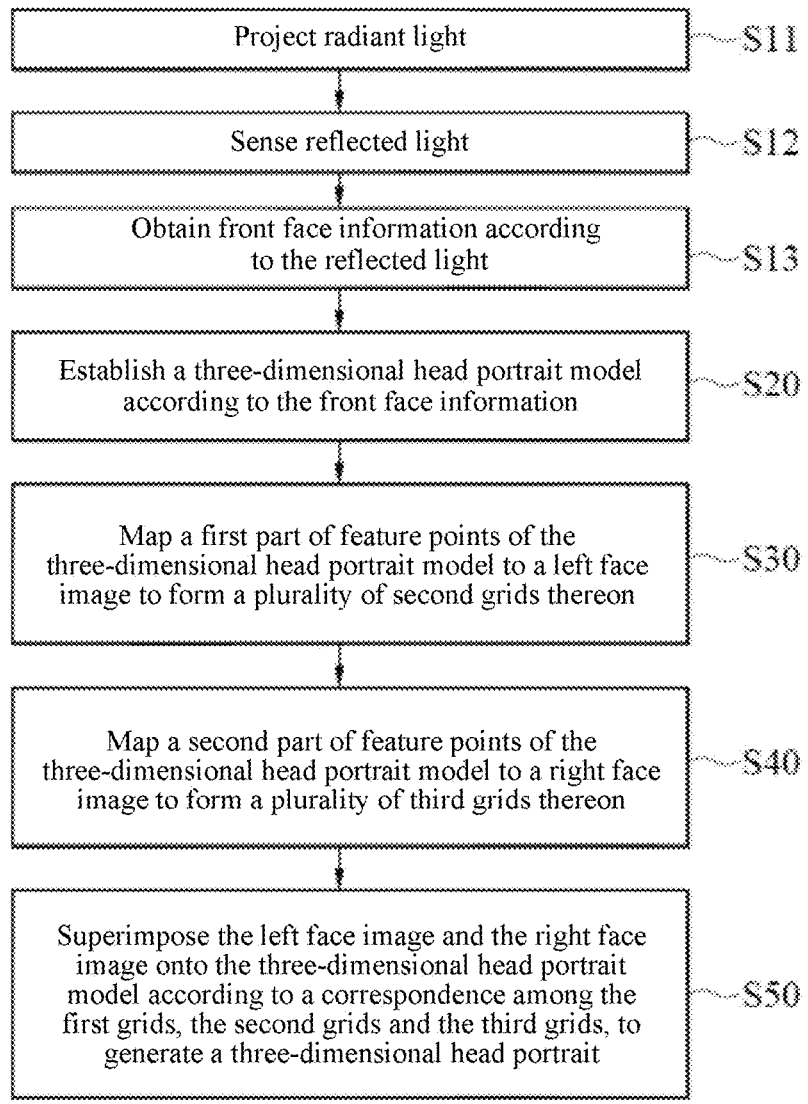
FIG. 3 is a flowchart of an embodiment of a three-dimensional head portrait generating method.
Figure 4:
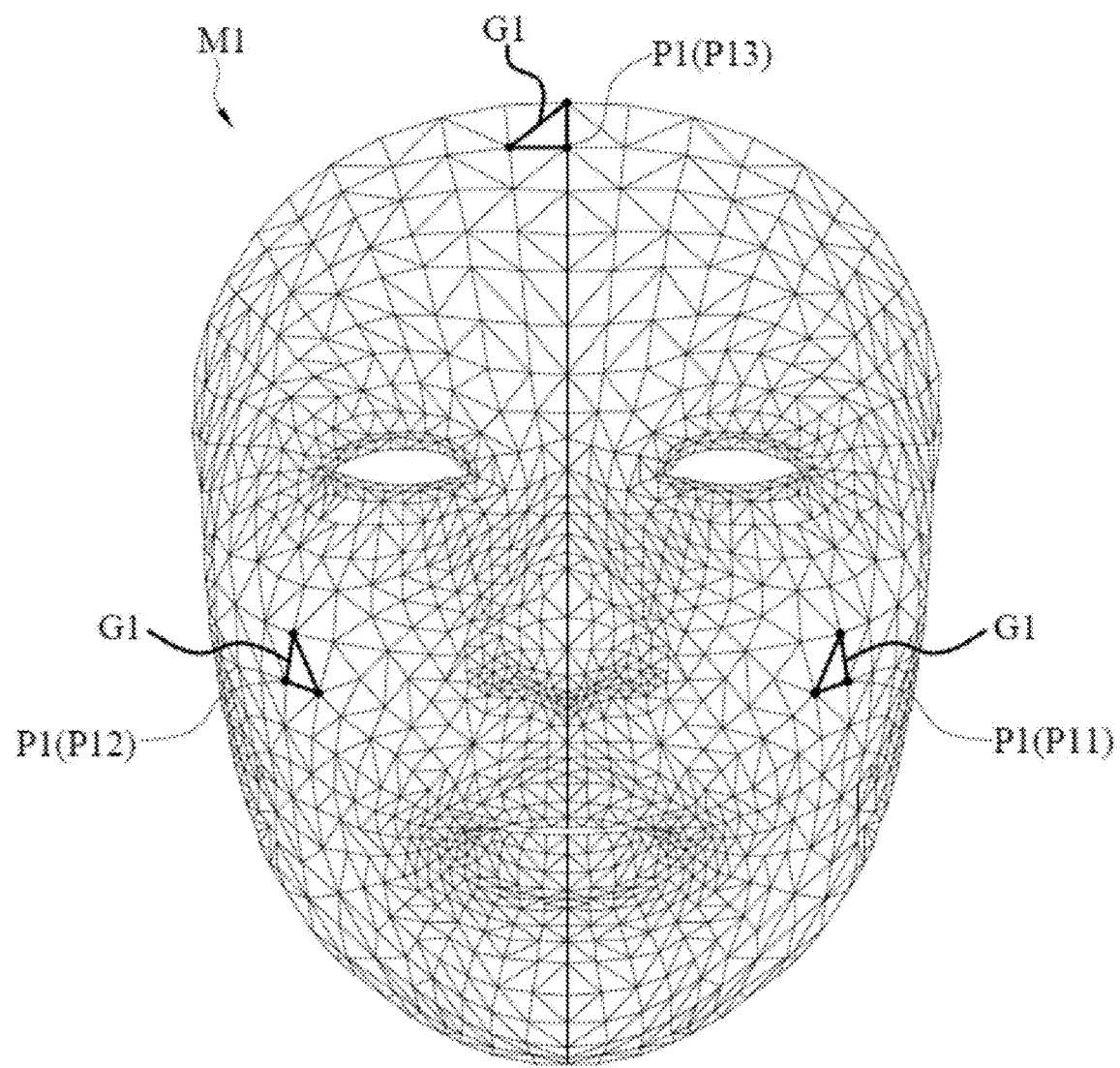
FIG. 4 is a schematic overview of an embodiment of a three-dimensional head portrait model.

FIG. 4 is a schematic overview of an embodiment of a three-dimensional head portrait model. Referring to FIG. 1 to FIG. 4, after obtaining the front face information with the depth information of the user's face U1, the processing unit 110 establishes a three-dimensional head portrait model M1 corresponding to the user according to the front face information (step S20). The established three-dimensional head portrait model M1 includes a plurality of feature points P1 corresponding to face features of the user's face U1, and the feature points P1 form a plurality of first grids G1 on the three-dimensional head portrait model M1.

In some embodiments, the processing unit 110 forms the first grids G1 by a gridding technology of a modeling technology. In an embodiment, the processing unit 110 uses a Delaunay Triangulation technology to form the plurality of first grids G1. In the Delaunay Triangulation technology, the feature points P1 are taken as vertexes of the first grids G1 to form the plurality of first grids G1 with triangular shape.

Figure 5:
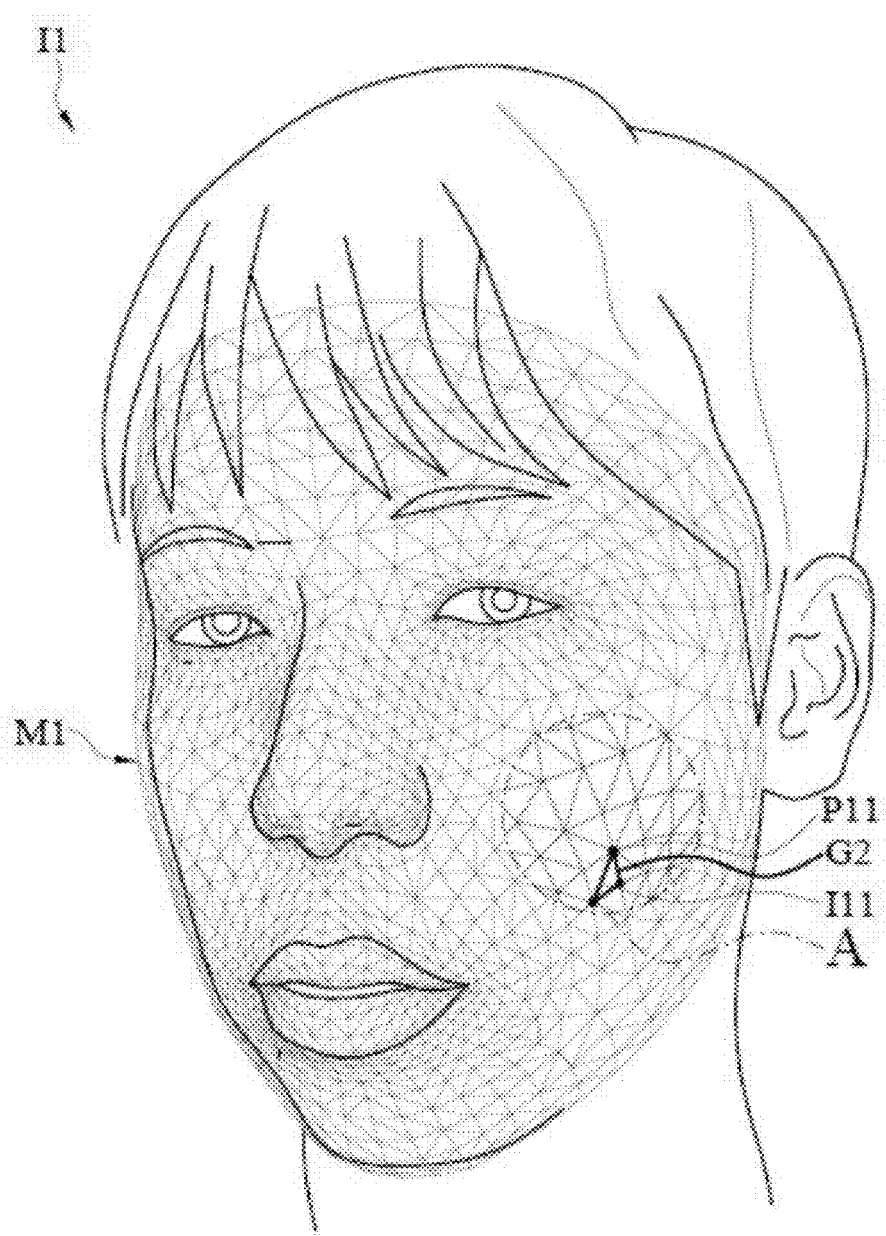
FIG. 5 is a schematic overview of an embodiment of a left face image.
Figure 6:
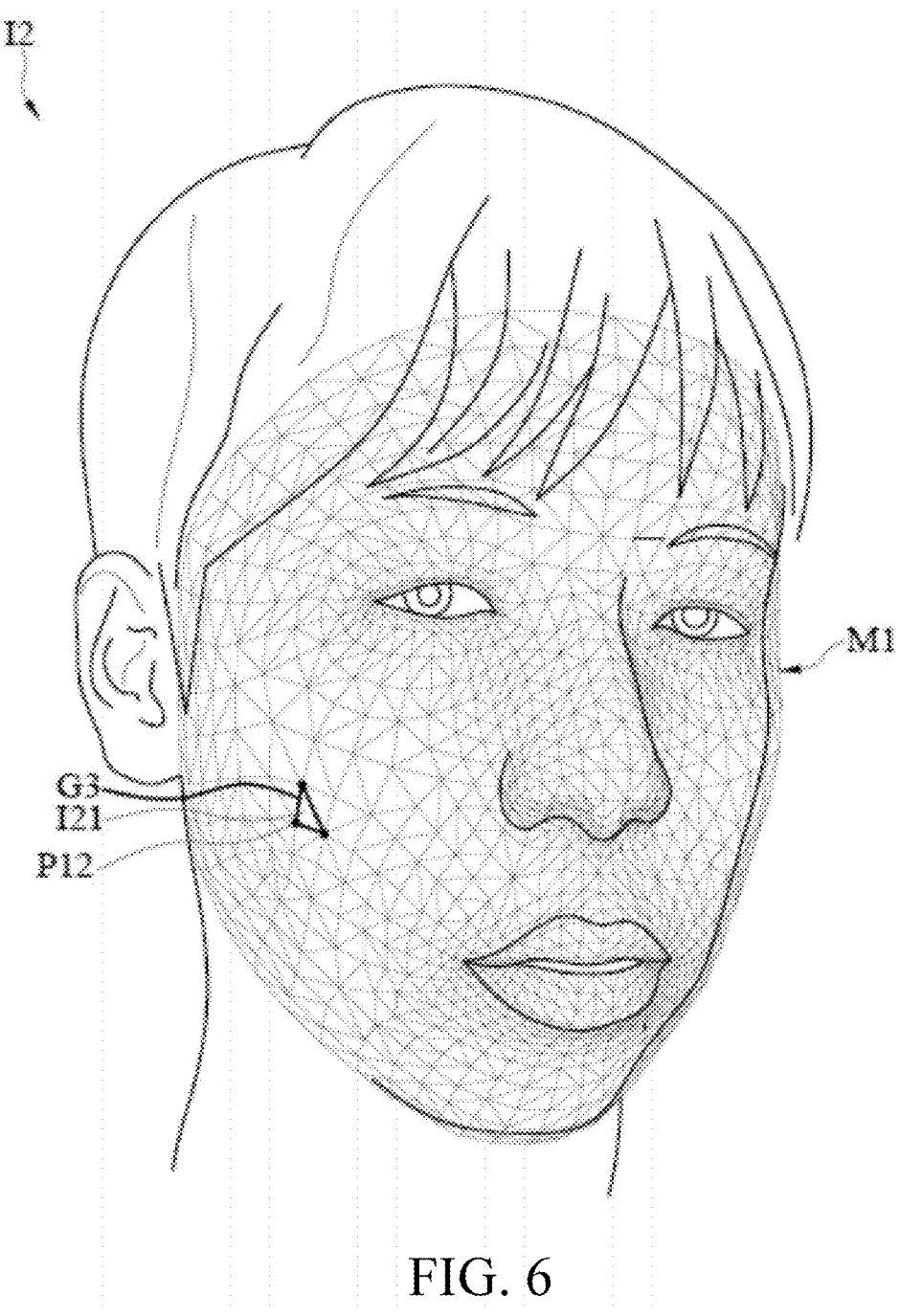
FIG. 6 is a schematic overview of an embodiment of a right face image.

FIG. 5 is a schematic overview of an embodiment of a left face image, and FIG. 6 is a schematic overview of an embodiment of a right face image. Referring to FIG. 1 to FIG. 6, the processing unit 110 performs image capture on a left side of the user's face U1 through the image capture unit 140 to obtain a left face image I1 including the left side of the user's face U1. When the left face image I1 is obtained, the processing unit 110 maps feature points P11 of the feature points P1 on the three-dimensional head portrait model M1 (that is, the feature points P11 is a first part of the feature points P1) to the left face image I1 to form a plurality of second grids G2 on the left face image I1, wherein the feature points P11 of the feature points P1 are corresponding to the left side of the user's face U1 (step S30). Similarly, the processing unit 110 also performs image capture on a right side of the user's face U1 through the image capture unit 140 to obtain a right face image I2 including the right side of the user's face U1. When the right face image I2 is obtained, the processing unit 110 correspondingly maps feature points P12 of the feature points P1 on the three-dimensional head portrait model M1 (that is, the feature points P12 is a second part of the feature points P1) to the right face image I2 to form a plurality of third grids G3 on the right face image I2, wherein the feature points P12 corresponding to the right side of the user's face U1 (step S40).

In some embodiments, the feature points P11 mapped to the left face image I1 and the feature points P12 mapped to the right face image I2 are partially overlapped (that is, the first part of the feature points P1 and the second part of the feature points P1 are partially overlapped). In an embodiment, since nose features appear on both the left face image I1 and the right face image I2, the feature points P11 corresponding to the nose features on the left face image I1 and the feature points P12 corresponding to the nose features on the right face image I2 are mapped from the same feature point P1 on the three-dimensional head portrait model Ml.

In some embodiments, the image capture unit 140 is an image capturing device with one lens or more lenses and photosensitive components, such as at least one of a complementary metal oxide semiconductor (CMOS) or a charge coupled device (CCD).

Figure 7:
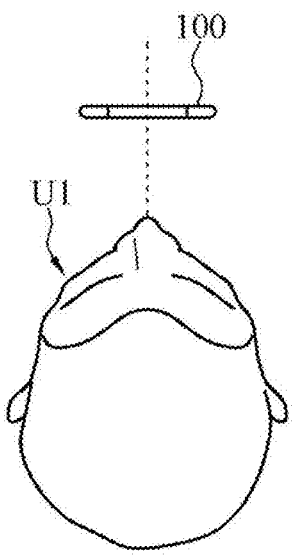
FIG. 7 is a schematic overview of an embodiment where a user's face faces an electronic device directly.
Figure 8:
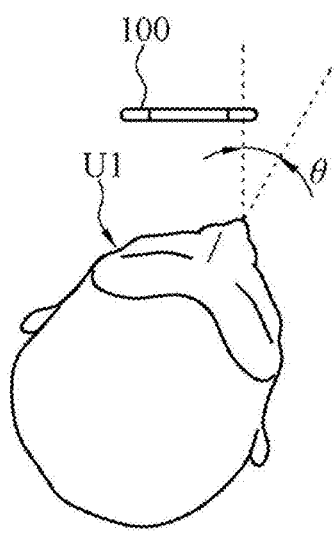
FIG. 8 is a schematic overview of an embodiment where a user's face is right-biased to an electronic device.
Figure 9:
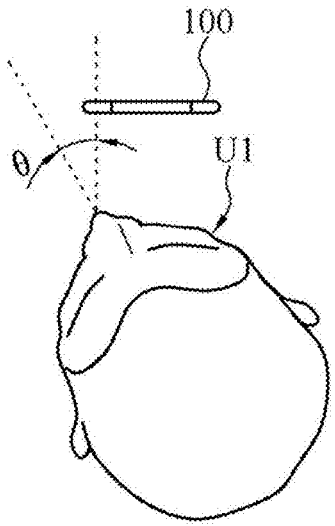
FIG. 9 is a schematic overview of an embodiment where a user's face is left-biased to an electronic device.

FIG. 7 is a schematic overview of an embodiment where a user's face faces an electronic device directly, FIG. 8 is a schematic overview of an embodiment where a user's face is right-biased to an electronic device, and FIG. 9 is a schematic overview of an embodiment where a user's face is left-biased to an electronic device. Referring to FIG. 1 to FIG. 9, in an embodiment, the processing unit 110 detects a deflection angle θ existing between the user's face U1 and the image capture unit 140 by the image capture unit 140 and a real-time image recognition technology, and the processing unit 110 automatically enables the image capture unit 140 to perform image capture on the user's face U1 to obtain a required left face image I1 or required right face image I2 when the processing unit 110 detects the deflection angle θ exiting between the user's face U1 and the image capture unit 140 is a specific degree. Herein, the deflection angle θ is zero when the user's face U1 faces the image capture unit 140 directly, the deflection angle θ has positive degrees when the user's face U1 turns right relative to the image capture unit 140, and the deflection angle θ has negative degrees when the user's face U1 turns left relative to the image capture unit 140. In some embodiments, the deflection angle θ is between from 30 degrees to 45 degrees or between from −30 degrees to −45 degrees.

In an embodiment of step S30, the processing unit 110 takes the feature points P11 mapped to the left face image I1 as the vertexes of the second grid G2 through the gridding technology to form a plurality of second grids G2 on the left face image I1. Similarly, in an embodiment of step S40, the processing unit 110 takes the feature points P12 mapped to the right face image I2 as the vertexes of the third grid G3 through the gridding technology to form a plurality of third grids G3 on the right face image I2. By the Delaunay Triangulation technology of gridding technology, the processing unit 110 forms a plurality of second grids G2 with triangular shape on the left face image I1, and forms a plurality of third grids G3 with triangular shape on the right face image I2.

Each second grid G2 corresponds to one of the plurality of first grids G1. Moreover, the plurality of feature points P11 included by each second grid G2 is the same as the plurality of feature points P1 included by the corresponding first grid G1. Similarly, each third grid G3 corresponds to one of the plurality of first grids G1. Moreover, the plurality of feature points P12 included by each third grid G3 is the same as the plurality of feature points P1 included by the corresponding first grid G1.

Finally, the processing unit 110 superimposes the left face image I1 and the right face image I2 onto the three-dimensional head portrait model M1 according to a correspondence among the first grids G1, the second grids G2 and the third grids G3 to generate a three-dimensional head portrait S1 of the user (step S50).

Figure 10:
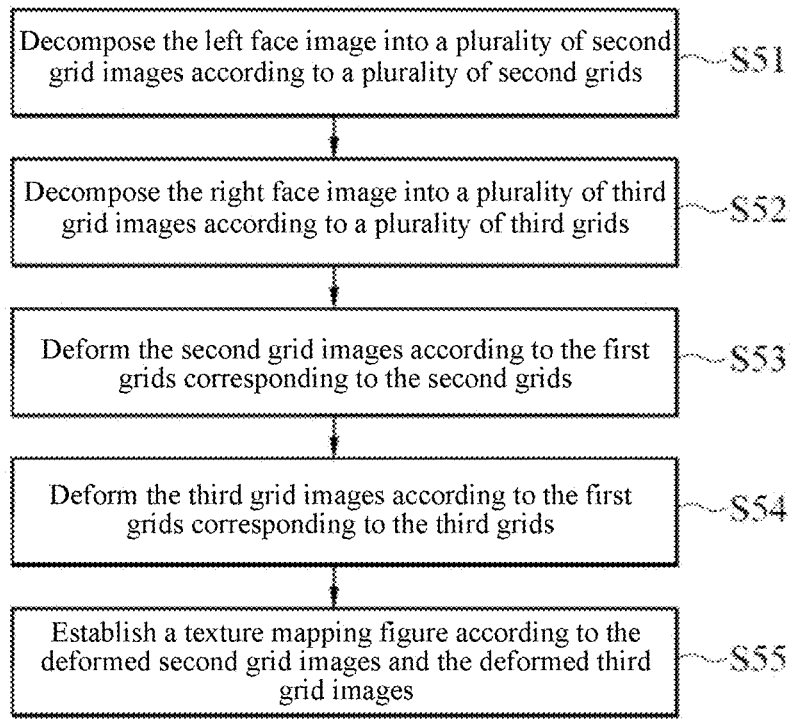
FIG. 10 is a flowchart of an embodiment of step S50 in FIG. 3.
Figure 11:
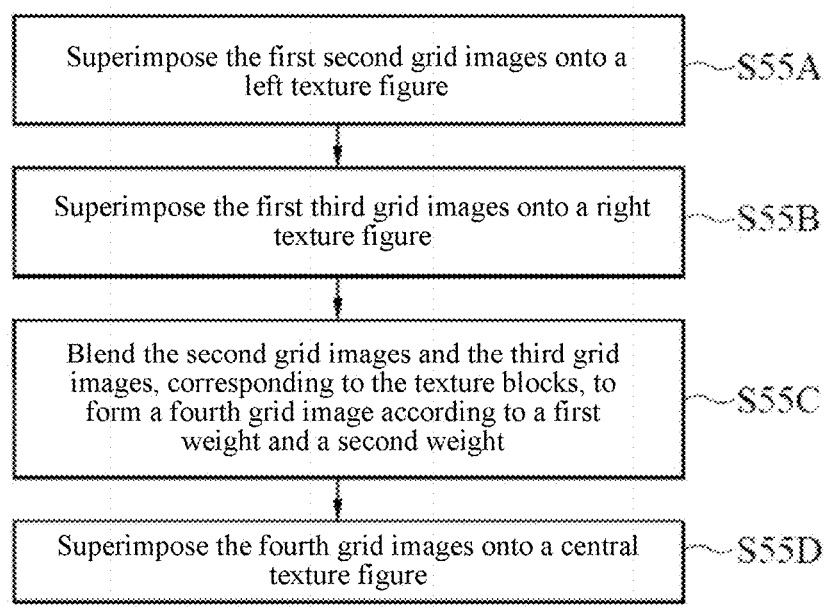
FIG. 11 is a flowchart of an embodiment of step S55 in FIG. 10.
Figure 12:
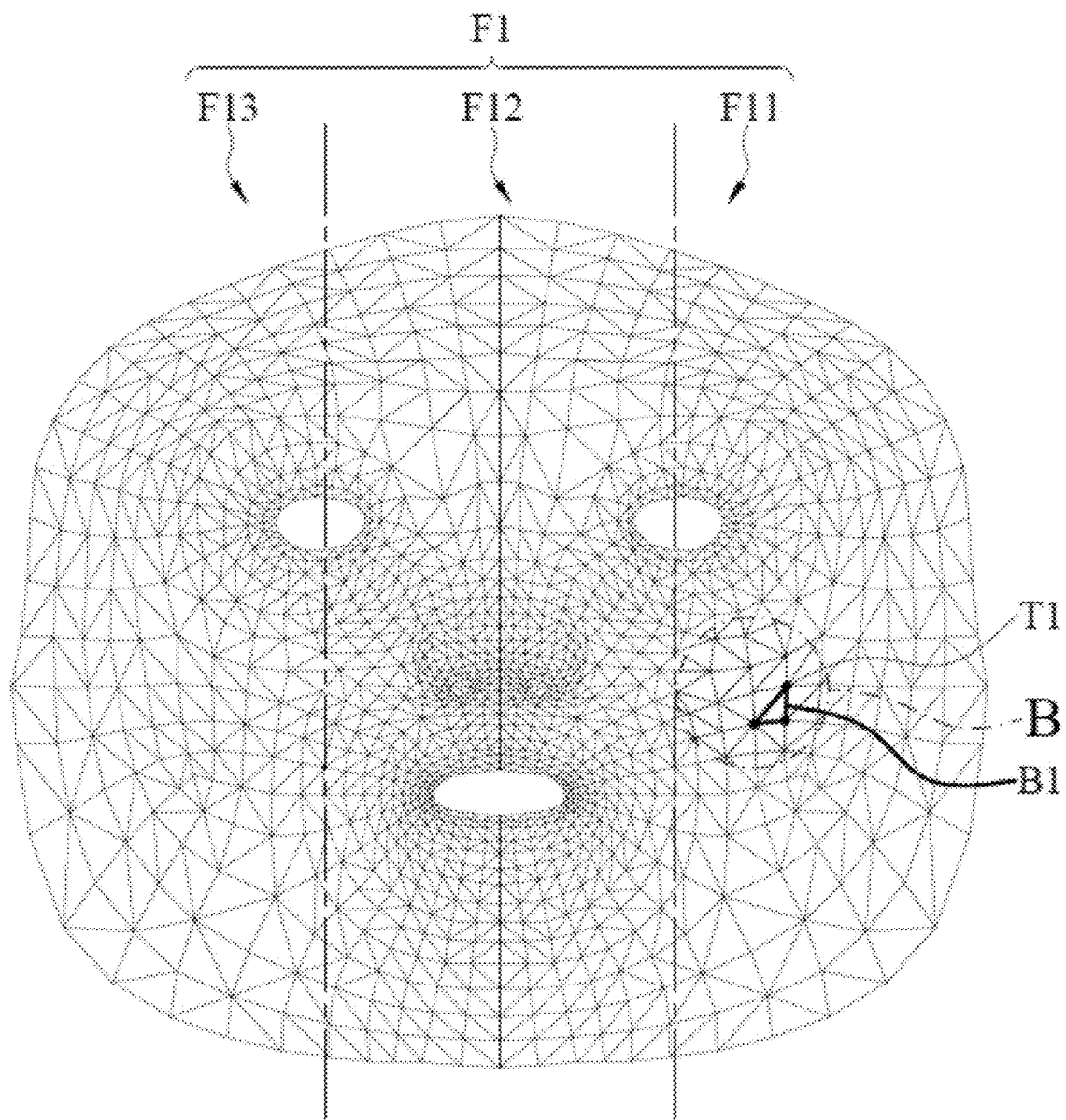
FIG. 12 is a schematic overview of an embodiment of a texture mapping figure.
Figure 13:
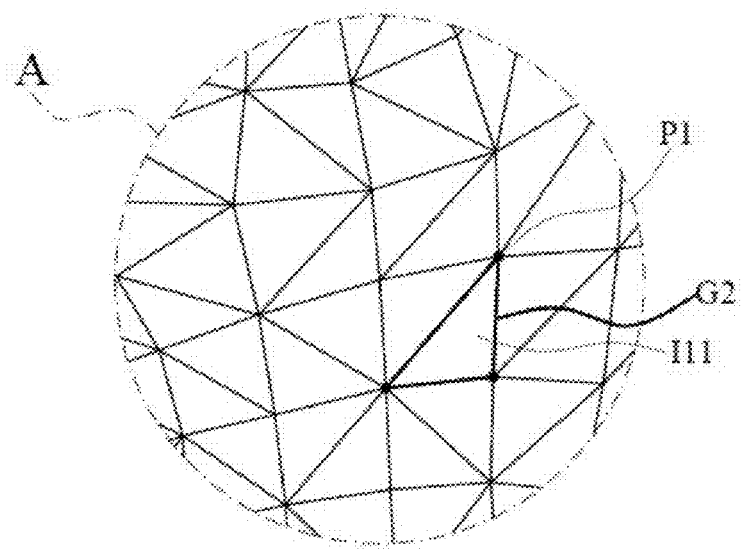
FIG. 13 is an enlarged schematic view of an embodiment of block A in FIG. 5.
Figure 14:
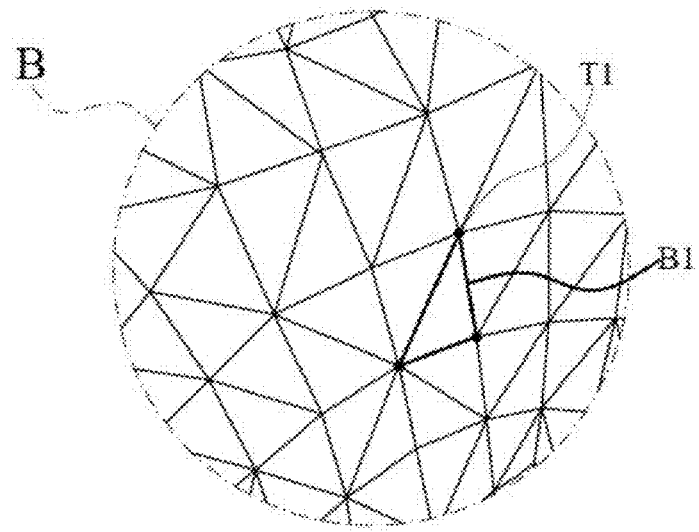
FIG. 14 is an enlarged schematic view of an embodiment of block B in FIG. 12.
Figure 15:
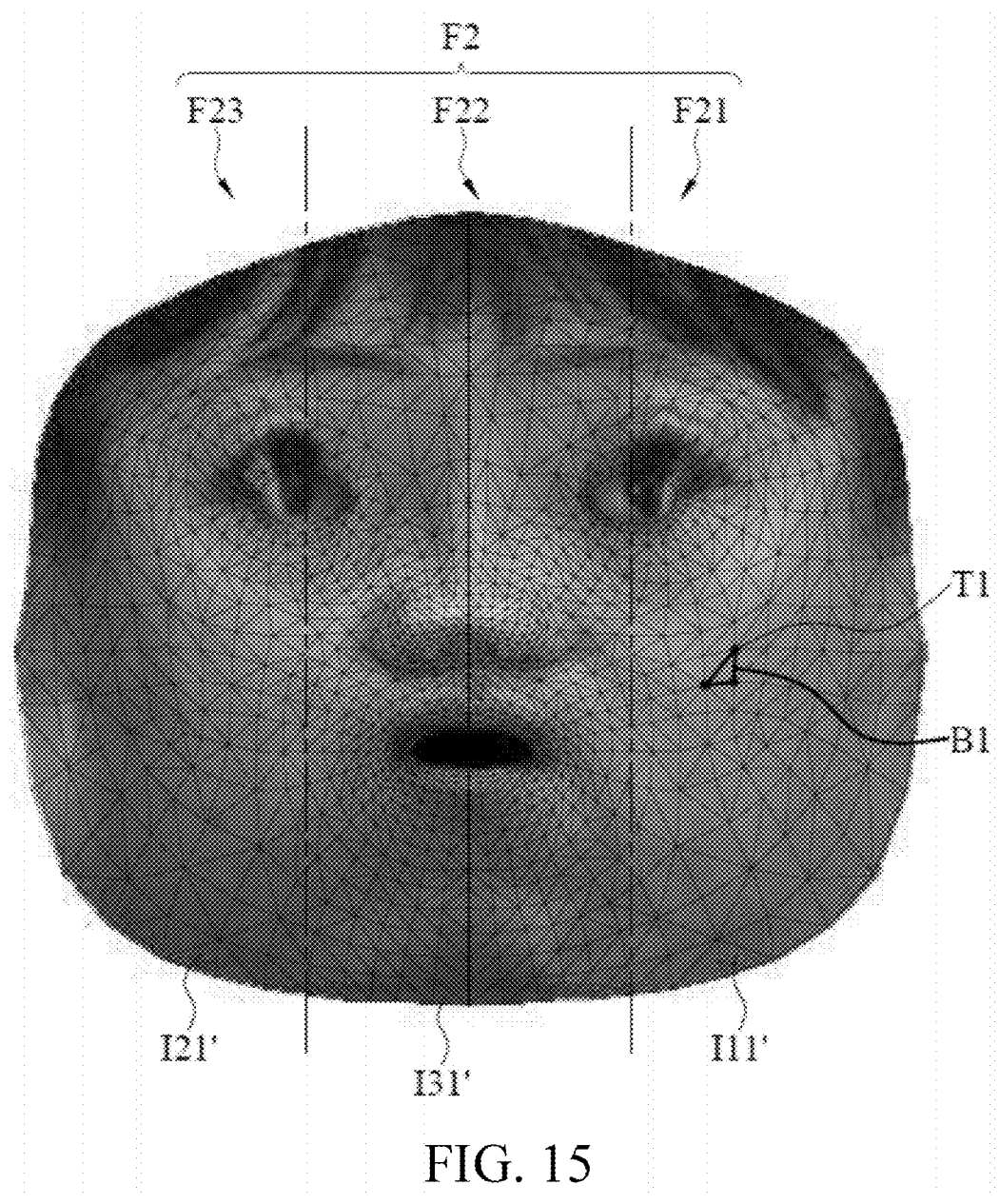
FIG. 15 is a schematic view of an example of a texture mapping figure.

FIG. 10 is a flowchart of an embodiment of step S50 in FIG. 3, FIG. 11 is a flowchart of an embodiment of step S55 in FIG. 10, FIG. 12 is a schematic overview of an embodiment of a texture mapping figure, FIG. 13 is an enlarged schematic view of an embodiment of block A in FIG. 5, FIG. 14 is an enlarged schematic view of an embodiment of block B in FIG. 12, and FIG. 15 is a schematic view of an example of a texture mapping figure. Referring to FIG. 1 to FIG. 15, in an embodiment of step S50, the processing unit 110 decomposes the left face image I1 into a plurality of second grid images I11 according to the second grids G2 formed on the left face image I1 (step S51). Similarly, the processing unit 110 also decomposes the right face image I2 into a plurality of third grid images I21 according to the third grids G3 formed on the right face image I2 (step S52). Afterwards, the processing unit 110 deforms the second grid images I11 according to the shape and the size of each of the first grids G1 corresponding to the second grids G2 (step S53), and deforms the third grid images I21 according to the shape and the size of each of the first grids G1 corresponding to each third grids G3 (step S54). Then, the processing unit 110 establishes a texture mapping figure F2 according to the deformed second grid image I11' and the deformed third grid image I21' (step S55). Finally, the processing unit 110 superimposes the texture mapping figure F2 onto the three-dimensional head portrait model M1 to generate a real three-dimensional head portrait S1 that is almost the same as the user (step S56).

In an embodiment of step S53 and step S54, the processing unit 110 unrolls a curved surface, including the first grids G1, of the three-dimensional head portrait model M1 to a texture mapping figure F1 that is two-dimensional type. The texture mapping figure F1 has a plurality of texture blocks B1, and each texture block B1 corresponds to one of the plurality of first grids G1. Herein, each texture block B1 is two-dimensional and corresponding to one of the first grids G1 of the curved surface. In addition, a vertex Ti of each texture block B1 corresponds to the feature point P1 included by the corresponding first grid G1. Since each second grid G2 is corresponding to one of the first grids G1 and each texture block B1 is formed by one of the first grids G1, each second grid G2 is corresponding to one of the texture blocks B1. Similarly, since each third grid G3 is corresponding to one of the first grids G1 and each texture block B1 is formed by one of the first grids G1, each third grid G3 is corresponding to one of the texture blocks B1.

Thereafter, the processing unit 110 deforms the second grid image I11 and the third grid image I21 by mapping transformation, such as a combination of translation, rotation, scaling, reflection, or transvection.

In some embodiments, each feature point P11 on the left face image I1 has corresponding two-dimensional coordinates, the vertex T1 of each texture block B1 has corresponding texture mapping coordinates, and the processing unit 110 maps the feature points P11 included by each second grid G2 to the vertex T1 of the corresponding texture block B1 by matrix transformation, so that the shape and the size of each of the second grid image I11 decomposed by each second grid G2 is the same as the shape and the size of the corresponding texture block B1 by deforming each the second grid image I11. Similarly, each feature point P12 on the right face image I2 also has corresponding two-dimensional coordinates, and the processing unit 110 maps the feature points P12 included by each third grid G3 to the vertex Ti of the corresponding texture block B1 by matrix transformation, so that the shape and the size of each of the third grid image I21 decomposed by each third grid G3 is the same as the shape and the size of the corresponding texture block B1 by deforming each third grid image I21.

In an embodiment, as shown in FIG. 11, the texture mapping figure F1 comprises a left texture figure F11, a central texture figure F12 and a right texture figure F13 connected in sequence from right to left. In addition, the deformed second grid images I11' are divided into first deformed second grid images and second deformed second grid images, and the deformed third grid images I21' are divided into first deformed third grid images and second deformed third grid images.

Here, each of the first deformed second grid images corresponds to one of the plurality of texture blocks B1 in the left texture figure F11, and each of the second deformed second grid images corresponds to one of the plurality of texture blocks B1 in the central texture figure F12. Moreover, each of the first deformed third grid images corresponds to one of the plurality of texture blocks B1 in the right texture figure F13, and each of the second deformed third grid images corresponds to one of the plurality of texture blocks B1 in the central texture figure F12. In other words, each texture block B1 in the central texture figure F12 corresponds to one of the second deformed second grid image and one of the second deformed third grid image respectively.

In an embodiment of step S55, the processing unit 110 superimposes each of the first deformed second grid images onto the corresponding texture block B1 in the left texture figure F11 (step S55A) to form a left texture figure F21, and superimposes each of the first deformed third grid images onto the corresponding texture blocks B1 in the right texture figure F13 (step S55B) to form a right texture figure F23. Moreover, in order to smooth an image seam of an established central texture figure F22, the processing unit 110 blends the second deformed second grid images and the second deformed third grid images corresponding to the texture blocks B1 of the central texture figure F12, to form fourth grid images I31' according to a first weight and a second weight of each texture block B1 in the central texture figure F12, wherein the first weight is used for the second deformed second grid image and the second weight is used for the second deformed third grid images (step S55C). Then, the processing unit 110 superimposes all fourth grid images I31' generated in step S55C onto the central texture figure F12 (step S55D) to form the established central texture figure F22 to complete establishment of the whole texture mapping figure F2. An example of the completed texture mapping figure F2 is shown in FIG. 15.

In an embodiment, the first weight and the second weight of one texture block B1 are different from the first weight and the second weight of another texture block B1, but a total value of the first weight and the second weight of each texture block B1 is 1. In an embodiment, when the texture block B1 is located in the central texture figure F12 but is closer to the left texture figure F11, a first weight of the texture block B1 is 0.75, and second weight of the texture block B1 is 0.25. Therefore, in the fourth grid image I31' blended by the second deformed second grid image and the second deformed third grid image corresponding to the texture block B1, the ratio of the second deformed second grid image is higher than that of the second deformed third grid image.

Figure 16:
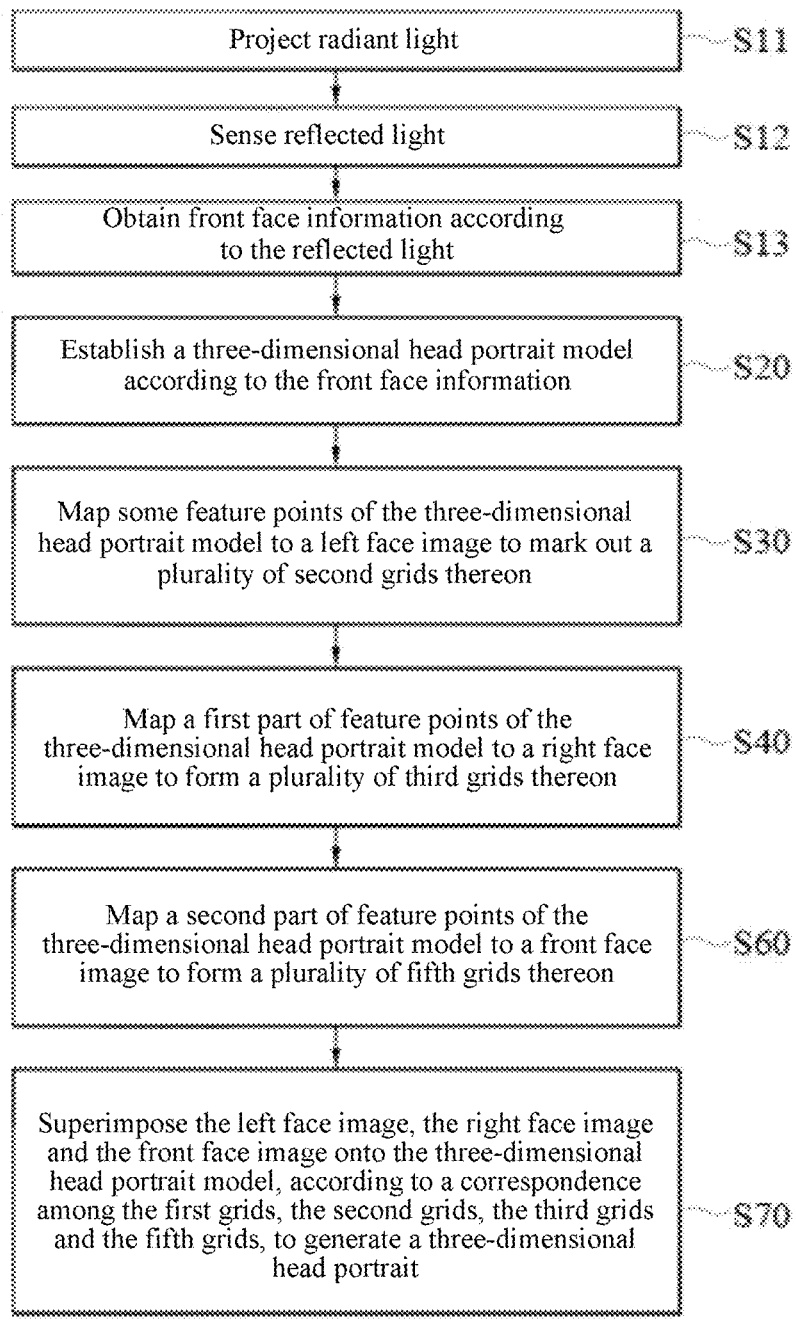
FIG. 16 is a flowchart of another embodiment of the three-dimensional head portrait generating method.
Figure 17:
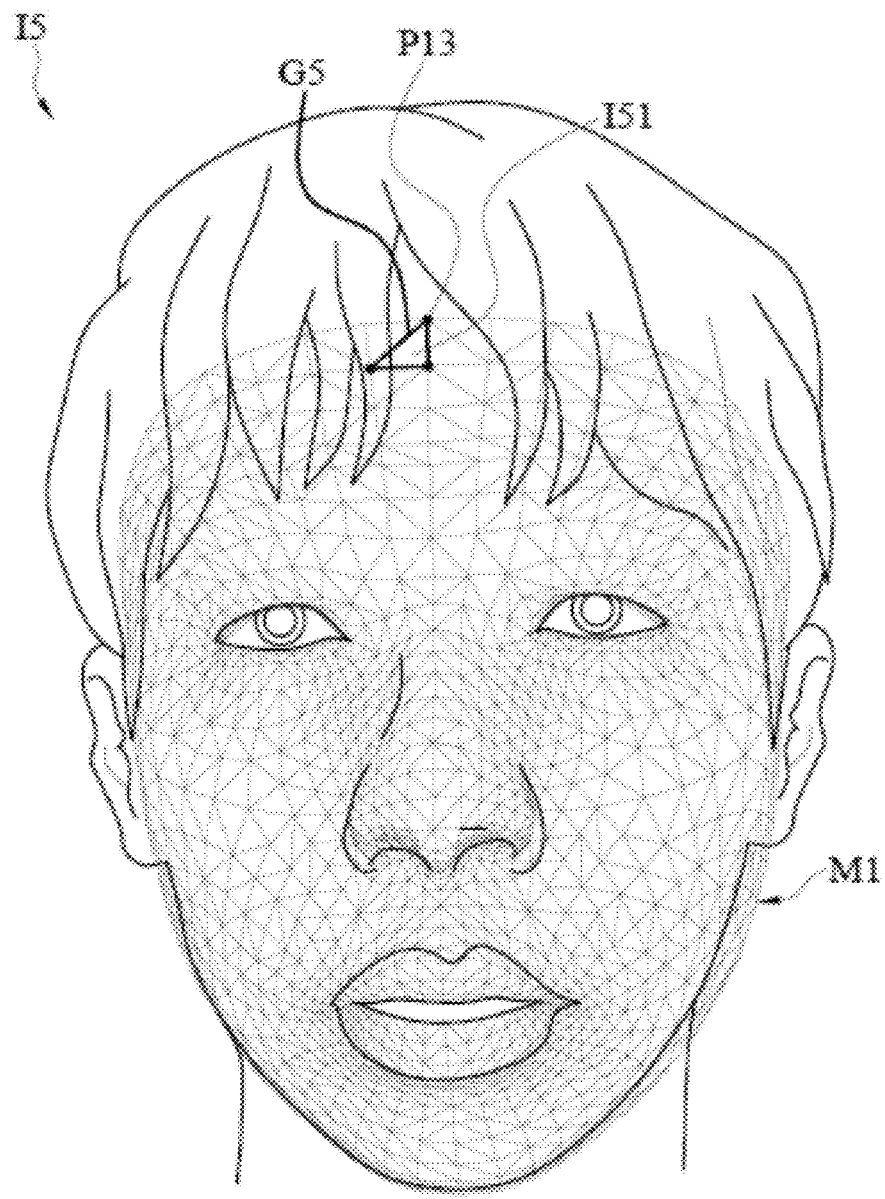
FIG. 17 is a schematic overview of an embodiment of a front face image.

FIG. 16 is a flowchart of another embodiment of a three-dimensional head portrait generating method, and FIG. 17 is a schematic overview of an embodiment of a front face image. Referring to FIG. 1 to FIG. 17, in an embodiment, the processing unit 110 generates a three-dimensional head portrait S1 according to the front face image I5, the left face image I1 and the right face image I2, so that the generated three-dimensional head portrait S1 is more accurate.

Since step S11 to step S40 are substantially the same as those in the foregoing embodiment, they will not be described again.

In an embodiment, the processing unit 110 further performs image capture on a front side of the user's face U1 through the image capture unit 140 to obtain a front face image I5 including the front side of the user's face U1. When the front face image I5 is obtained, the processing unit 110 maps feature points P13 of the feature points P1 on the three-dimensional head portrait model M1 (that is, the feature points P13 is a third part of the feature points P1) to the front face image I5 to form a plurality of fifth grids G5 on the front face image I5, the feature points P13 of the feature points P1 are corresponding to the front side of the user's face U1 (step S60).

In some embodiments, the feature points P13 mapped to the front face image I5, the feature points P11 mapped to the left face image I1 and the feature points P12 mapped to the right face image I2 are partially overlapped (that is, the first part of the feature points P1, the second part of the feature points P1 and the third part of the feature points P1 are partially overlapped). In an embodiment, since lip features appear on the front face image I5, the left face image I1 and the right face image I2, the feature points P13 corresponding to the lip features on the front face image I5, the feature points P11 corresponding to the lip features on the left face image I1 and the feature points P12 corresponding to the lip features on the right face image I2 are mapped from the same feature point P1 on the three-dimensional head portrait model M1.

In an embodiment, the processing unit 110 detects a deflection angle θ existing between the user's face U1 and the image capture unit 140 by the image capture unit 140 and a real-time image recognition technology, and the processing unit 110 automatically enables the image capture unit 140 to perform image capture on the user's face U1 to obtain a required front face image I5 when the processing unit 110 detects the deflection angle θ exiting between the user's face U1 and the image capture unit 140 is a specific degree. In some embodiments, the deflection angle θ is between from 10 degrees to −10 degrees.

In an embodiment of step S60, the processing unit 110 takes the feature points P13 mapped to the front face image I5 as the vertexes of the fifth grids G5 through the gridding technology to form a plurality of fifth grids G5 on the front face image I5. By the Delaunay Triangulation technology of gridding technology, the processing unit 110 forms a plurality of fifth grids G5 with triangular shape on the front face image I5.

Each fifth grid G5 corresponds to one of the plurality of first grids G1. Moreover, the plurality of feature points P13 included by each fifth grid G5 is the same as the plurality of feature points P1 included by the corresponding first grid G1.

Finally, the processing unit 110 superimposes the left face image I1, the right face image I2 and the front face image I5 in the three-dimensional head portrait model M1 according to a correspondence among the first grids G1, the second grids G2, the third grids G3 and the fifth grids G5 to generate a three-dimensional head portrait S1 of the user (step S70).

Figure 18:
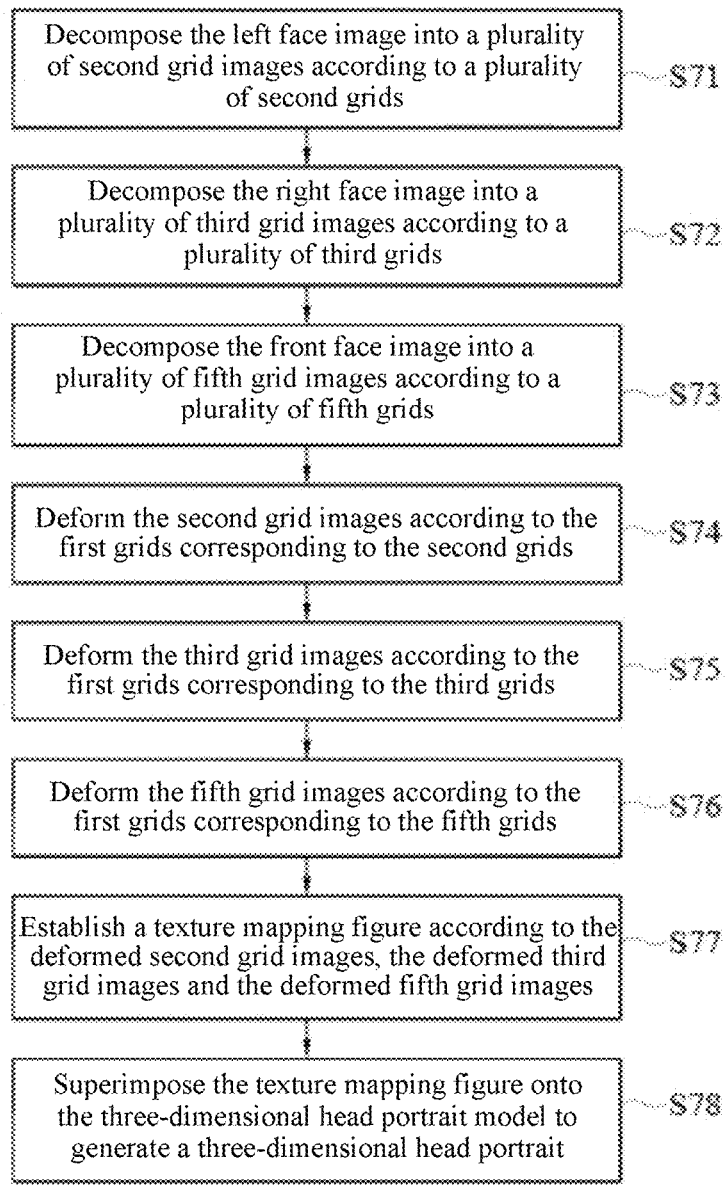
FIG. 18 is a flowchart of an embodiment of step S70 in FIG. 16.
Figure 19:
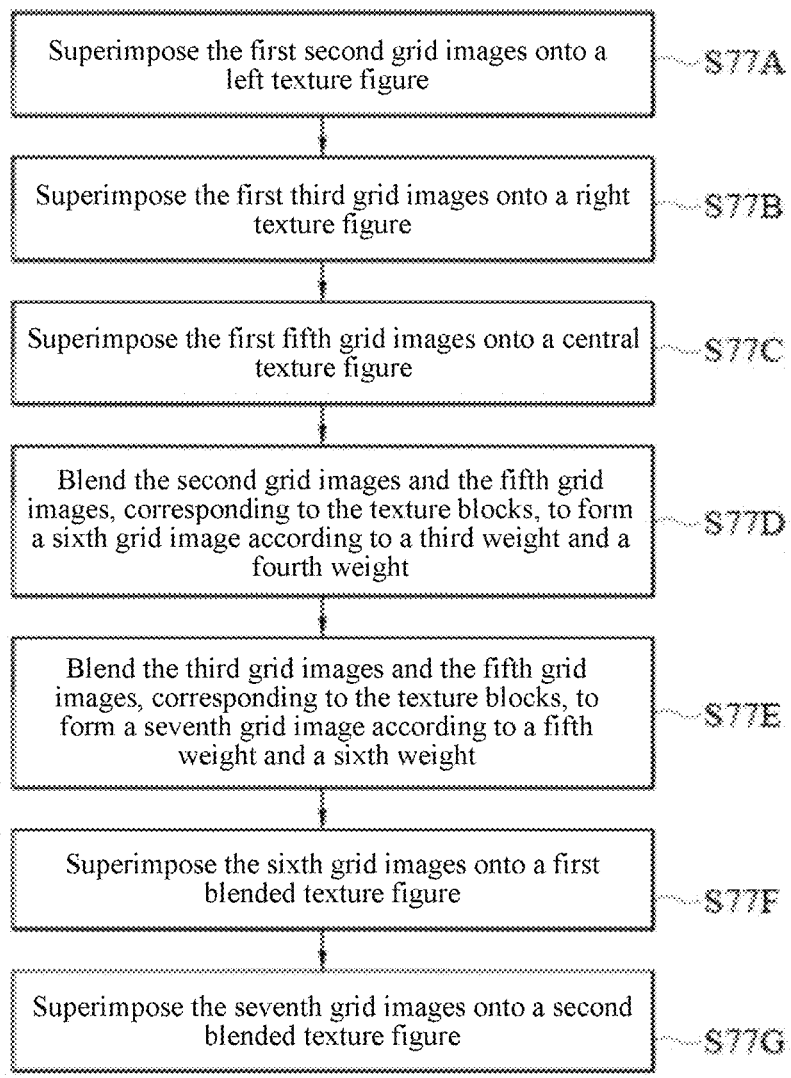
FIG. 19 is a flowchart of an embodiment of step S77 in FIG. 18.
Figure 20:
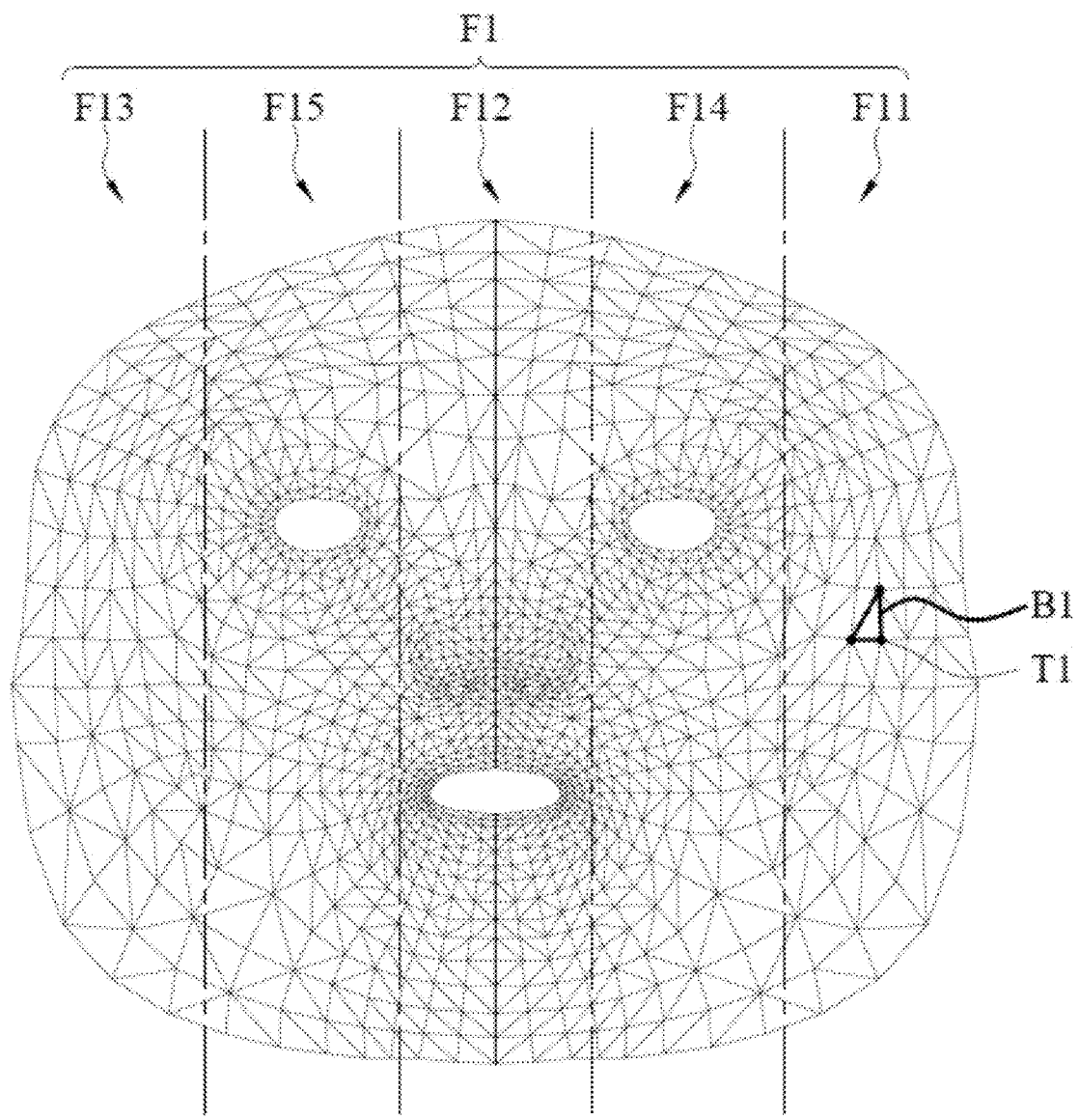
FIG. 20 is a schematic overview of an embodiment of a texture mapping figure.
Figure 21:
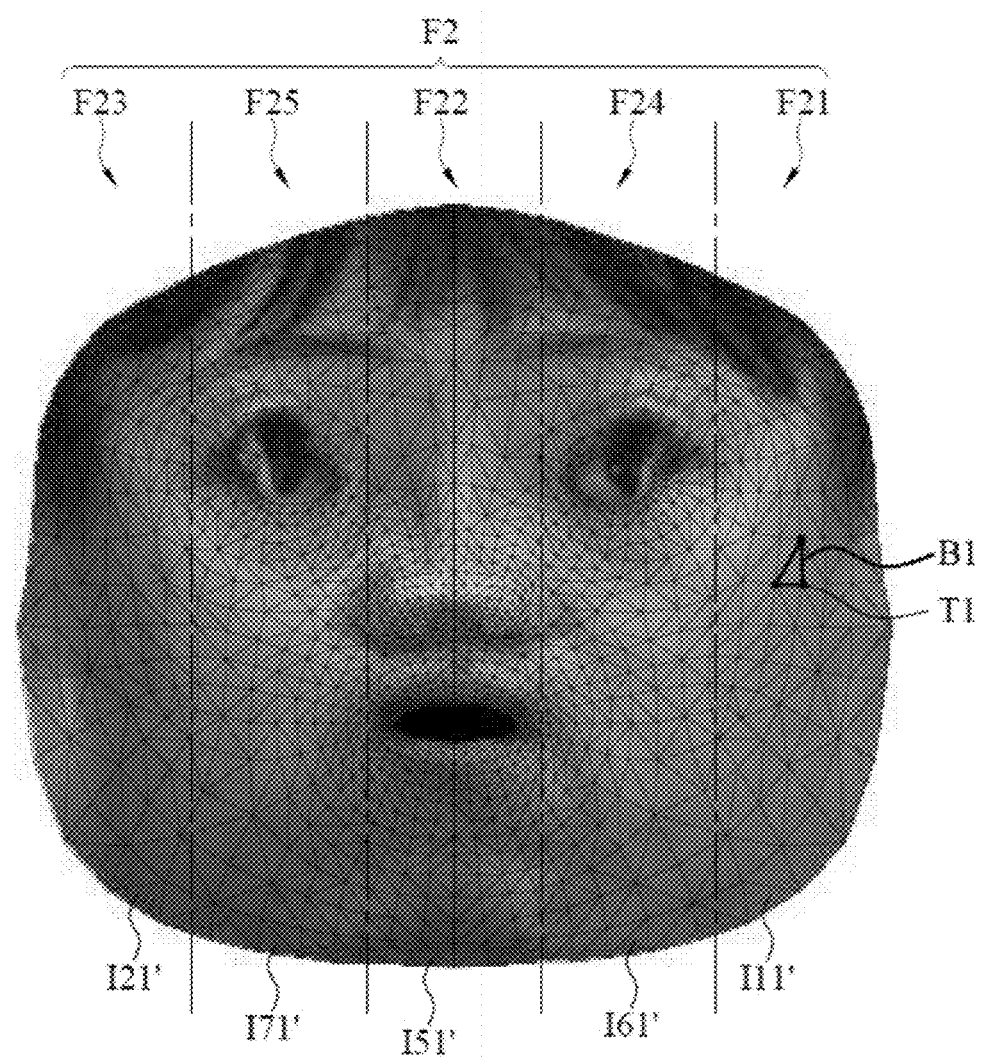
FIG. 21 is a schematic view of an example of a texture mapping figure.

FIG. 18 is a flowchart of an embodiment of step S70 in FIG. 16, FIG. 19 is a flowchart of an embodiment of step S77 in FIG. 18, FIG. 20 is a schematic overview of an embodiment of a texture mapping figure, and FIG. 21 is a schematic view of an example of a texture mapping figure. Referring to FIG. 1 to FIG. 21, in an embodiment of step S70, the processing unit 110 decomposes the left face image I1 into a plurality of second grid images I11 according to the second grids G2 formed on the left face image I1 (step S71), decomposes the right face image I2 into a plurality of third grid images I21 according to the third grids G3 formed on the right face image I2 (step S72), and decomposes the front face image I5 into a plurality of fifth grid images I51 according to the fifth grids G5 formed on the front face image I5 (step S73). Afterwards, the processing unit 110 deforms the second grid images I11 according to the shape size of the first grids G1 corresponding to the second grids G2 (step S74), deforms the third grid images I21 according to the shape size of the first grids G1 corresponding to the third grids G3 (step S75), and deforms the fifth grid images I51 according to the shape size of the first grids G1 corresponding to the fifth grids G5 (step S76). Then, the processing unit 110 establishes a texture mapping figure F2 according to the deformed second grid images I11', the deformed third grid images I21' and the deformed fifth grid images I51' (step S77). Finally, the processing unit 110 superimposes the texture mapping figure F2 onto the three-dimensional head portrait model M1 to generate a real three-dimensional head portrait S1 that is almost the same as the user (step S78).

In an embodiment of step S71 and step S73, the processing unit 110 unrolls a curved surface, including the first grids G1, of the three-dimensional head portrait model M1 to a texture mapping figure F1 in two-dimensional type. The texture mapping figure F1 has a plurality of texture blocks B1, and each texture block B1 corresponds to one of the plurality of first grids G1. Herein, each texture block B1 is two-dimensional and corresponding to one of the first grids G1 of the curved surface. Since each second grid G2 is corresponding to one of the first grids G1 and each texture block B1 is formed by one of the first grids G1, each second grid G2 is corresponding to one of the texture blocks B1. Similarly, since each third grid G3 is corresponding to one of the first grids G1 and each texture block B1 is formed by one of the first grids G1, each third grid G3 is corresponding to one of the texture blocks B1. Similarly, since each fifth grid G5 is corresponding to one of the first grids G1 and each texture block B1 is formed by one of the first grids G1, each fifth grid G5 is corresponding to one of the texture blocks B1. Thereafter, the processing unit 110 also deforms the second grid image I11, the third grid image I21 and the fifth grid image I51 by mapping transformation, such as a combination of translation, rotation, scaling, reflection, or transvection.

In some embodiments, each feature point P13 on the front face image I5 has corresponding two-dimensional coordinates, the vertex T1 of each texture block B1 has corresponding texture mapping coordinates, and the processing unit 110 maps the feature points P13 included by each fifth grid G5 to the vertex T1 of the corresponding texture block B1 by matrix transformation, so that the shape size of the fifth grid image I51 decomposed by each fifth grid G5 is the same as the shape size of the corresponding texture block B1 by deforming the fifth grid image I51. Here, the deformation of the second grid image I11 and the third grid image I21 are referred to the foregoing description, and therefore will not be described again.

In an embodiment, as shown in FIG. 20, the texture mapping figure F1 comprises a left texture figure F11, a first blended texture figure F14, a central texture figure F12, a second blended texture figure F15 and a right texture figure F13 connected in sequence from right to left. The deformed second grid images I11' are divided into first deformed second grid images and second deformed second grid images, the deformed third grid images I21' are divided into first deformed third grid images and second deformed third grid images, and the deformed fifth grid images I51' are divided into first deformed fifth grid images, second deformed fifth grid images and third deformed fifth grid images.

Each of the first deformed second grid images corresponds to one of the plurality of texture blocks B1 in the left texture figure F11, and each of the second deformed second grid images corresponds to one of the plurality of texture blocks B1 in the first blended texture figure F14. Each of the first deformed third grid images corresponds to one of the plurality of texture blocks B1 in the right texture figure F13, and each of the second deformed third grid images corresponds to one of the plurality of texture blocks B1 in the second blended texture figure F15. Moreover, each of the first deformed fifth grid images corresponds to the central texture figure F12, each of the second deformed fifth grid images corresponds to one of the plurality of texture blocks B1 in the first blended texture figure F14, and each of the third deformed fifth grid images corresponds to one of the plurality of texture blocks B1 in the second blended texture figure F15. In other words, each texture block B1 in the first blended texture figure F14 corresponds to one of the second deformed second grid image and one of the second deformed fifth grid images respectively, and each texture block B1 in the second blended texture figure F15 corresponds to one of the second deformed third grid images and one of the third deformed fifth grid images' respectively.

In an embodiment of step S77, the processing unit 110 superimposes each of the first deformed second grid images onto the corresponding texture blocks B1 in the left texture figure F11 (step S77A) to form a left texture figure F21, superimposes each of the first deformed third grid images onto the corresponding texture blocks B1 in the right texture figure F13 (step S77B) to form a right texture figure F23, and superimposes each of the first deformed fifth grid images onto the central texture figure F12 (step S77C) to form a central texture figure F22.

In order to smooth an image seam of an established texture mapping figure F2, the processing unit 110 blends the second deformed second grid images and the second deformed fifth grid images corresponding to the texture blocks B1 of the first blended texture figure F14 to form sixth grid images I61' according to a third weight and a fourth weight of each texture block B1 in the first blended texture figure F14, wherein the third weight is used for the second deformed second grid images and the fourth weight is used for the second deformed fifth grid images (step S77D). In an embodiment, the third weight and the fourth weight of one texture block B1 are different from the third weight and the fourth weight of another texture block B1, but a total value of the third weight and the fourth weight of each texture block B1 is 1.

Similarly, the processing unit 110 blends the second deformed third grid images and the third deformed fifth grid images corresponding to the texture blocks B1 of the second blended texture figure F15 to form seventh grid images I71' according to a fifth weight and a sixth weight of each texture block B1 in the second blended texture figure F15, wherein the fifth weight is used for the third grid image I21' and the sixth weight is used for the fifth grid image I51' (step S77E). In an embodiment, the fifth weight and the sixth weight corresponding of one texture block B1 are different from the fifth weight and the sixth weight of another texture block B1, but a total value of the fifth weight and the sixth weight of each texture block B1 is 1.

Thereafter, the processing unit 110 superimposes all the sixth grid images I61' generated in step S77D onto the first blended texture figure F14 (step S77F) to form a first blended texture figure F24, and superimposes all the seventh grid images I71' generated in step S77E onto the second blended texture figure F15 (step S77G) to form a second blended texture figure F25, so as to complete establishment of the whole texture mapping figure F2. An example of the completed texture mapping figure F2 is shown in FIG. 21.

In an embodiment, the three-dimensional head portrait generating method of any embodiment of the invention is implemented by a non-transitory readable memory medium. The non-transitory readable memory medium stores a plurality of program codes, when an electronic device 100 loads and executes the plurality of program codes, the program codes cause the electronic device 100 to execute the three-dimensional head portrait generating method of any one of the foregoing embodiments. In an embodiment, the non-transitory readable memory medium is a storage component 160 inside the electronic device 100. In some embodiments, the storage component 160 is a read-only memory (ROM) or a flash memory. In another embodiment, the non-transitory readable memory medium is a remote storage component, and is transmitted into the electronic device 100 in a wired or wireless manner. In yet another embodiment, the non-transitory readable memory medium is a storage component outside the electronic device 100, and the program codes in the storage component are accessed by connection of a reader or a connector of the electronic device 100.

In an embodiment, after the processing unit 110 generates the three-dimensional head portrait S1, the three-dimensional head portrait S1 is output to the display unit 150 for display. In some embodiments, the display unit 150 is any suitable display screen such as an LCD screen or an LED screen.

In an embodiment, after the processing unit 110 generates the three-dimensional head portrait S1, the three-dimensional head portrait is stored in the storage component 160 of the electronic device 100, and the established three-dimensional head portrait S1 is used for the user to perform various applications subsequently. In an embodiment, when another user uses the electronic device 100, the established three-dimensional head portrait S1 is changed according to a current facial expression of another user, such as opening the mouth or closing the eyes.

In an embodiment, the three-dimensional head portrait S1 generated by the processing unit 110 is used in any application of augmented reality (AR), and in an embodiment, the three-dimensional head portrait S1 is applied to application services such as virtual plastic surgery and virtual makeup.

In some embodiments, the processing unit 110 is implemented by using a system on chip (SoC), a central processing unit (CPU), a micro control unit (MCU) or an application specific integrated circuit (ASIC). In addition, the electronic device 100 is a smart phone, a notebook computer, a tablet computer, or other suitable electronic devices.

In summary, compared to conventional methods, it is necessary to capture face images of a plurality of successive angles, and the face images of the plurality of successive angles are subjected to multiple matching and superimposing operations to generate a three-dimensional head portrait. In the disclosure, second grids and third grids corresponding to first grids on a three-dimensional head portrait model are separately defined on a left face image and a right face image, and the left face image and the right face image are combined in the three-dimensional head portrait model according to a correspondence between the first grids, the second grids and the third grids, thereby effectively shortening the matching and superimposing time for an electronic device to more simply and quickly calculate a real three-dimensional head portrait that is almost the same as a user.

The above-described embodiments and/or implementations are merely illustrative of preferred embodiments and/or implementations for practicing the techniques of the invention, and are not intended to limit the embodiments of the techniques of the invention in any manner, and any person skilled in the art may make various variations or modifications to obtain other equivalent embodiments without departing from the scope of the technical means disclosed herein, and all such embodiments should still be considered to be substantially the same techniques or embodiments as the invention.

What is claimed is:

1. A three-dimensional head portrait generating method, comprising:
   establishing a three-dimensional head portrait model with a plurality of feature points according to front face information sensed by a sensing unit and a Delaunay Triangulation technology, wherein the feature points form a plurality of first grids on the three-dimensional head portrait model, the feature points are taken as vertexes of the first grids to form the plurality of first grids with triangular shape;
   mapping a first part of the feature points of the three-dimensional head portrait model to a left face image captured through an image capture unit to form a plurality of second grids on the left face image;
   mapping a second part of the feature points of the three-dimensional head portrait model to a right face image captured through the image capture unit to form a plurality of third grids on the right face image; and
   superimposing the left face image and the right face image onto the three-dimensional head portrait model according to a correspondence among the first grids, the second grids and the third grids, to generate a three-dimensional head portrait.

2. The three-dimensional head portrait generating method according to claim 1, wherein the step of generating the three-dimensional head portrait further comprises follow steps:
   decomposing the left face image into a plurality of second grid images according to the second grids;
   decomposing the right face image into a plurality of third grid images according to the third grids;
   deforming the second grid images according to the first grids corresponding to the second grids;
   deforming the third grid images according to the first grids corresponding to the third grids;
   establishing a texture mapping figure according to the deformed second grid images and the deformed third grid images; and
   superimposing the texture mapping figure onto the three-dimensional head portrait model to generate the three-dimensional head portrait.

3. The three-dimensional head portrait generating method according to claim 2, wherein the texture mapping figure has a plurality of texture blocks, the texture mapping figure comprises a left texture figure, a central texture figure and a right texture figure connected in sequence, the deformed second grid images are divided into first deformed second grid images and second deformed second grid images, the deformed third grid images are divided into first deformed third grid images and second deformed third grid images, each texture block of the central texture figure corresponds to one of the second deformed second grid images and one of the second deformed third grid images, and the step of establishing the texture mapping figure comprises:
   superimposing the first deformed second grid images onto the texture blocks of the left texture figure;
   superimposing the first deformed third grid images onto the texture blocks of the right texture figure;
   blending the second deformed second grid images and the second deformed third grid images, corresponding to the texture blocks of the central texture figure, to form a fourth grid image according to a first weight and a second weight of each texture block in the central texture figure; and
   superimposing the fourth grid image onto the texture blocks of the central texture figure.

4. The three-dimensional head portrait generating method according to claim 3, wherein a total value of the first weight and the second weight is 1.

5. The three-dimensional head portrait generating method according to claim 1, wherein the step of generating the three-dimensional head portrait, the method further comprises:

mapping a third part of the feature points of the three-dimensional head portrait model to a front face image to form a plurality of fifth grids on the front face image, and superimposing the left face image, the right face image and the front face image onto the three-dimensional head portrait model according to a correspondence among the first grids, the second grids, the third grids and the fifth grids, to generate a three-dimensional head portrait.

6. The three-dimensional head portrait generating method according to claim 5, wherein the step of generating the three-dimensional head portrait comprises:

decomposing the left face image into a plurality of second grid images according to the second grids;

decomposing the right face image into a plurality of third grid images according to the third grids;

decomposing the front face image into a plurality of fifth grid images according to the fifth grids;

deforming the second grid images according to the first grids corresponding to the second grids;

deforming the third grid images according to the first grids corresponding to the third grids;

deforming the fifth grid images according to the first grids corresponding to the fifth grids;

establishing a texture mapping figure according to the deformed second grid images, the deformed third grid images and the deformed fifth grid images; and superimposing the texture mapping figure onto the three-dimensional head portrait model to generate the three-dimensional head portrait.

7. The three-dimensional head portrait generating method according to claim 6, wherein the texture mapping figure has a plurality of texture blocks, the texture mapping figure comprises a left texture figure, a first blended texture figure, a central texture figure, a second blended texture figure and a right texture figure connected in sequence, the deformed second grid images are divided into first deformed second grid images and second deformed second grid images, the deformed third grid images are divided into first deformed third grid images and second deformed third grid images, the deformed fifth grid images are divided into first deformed fifth grid images, second deformed fifth grid images and third deformed fifth grid images, each texture block of the first blended texture figure corresponds to one of the second deformed second grid images and one of the second deformed fifth grid images, each texture block of the second blended texture figure corresponds to one of the second deformed third grid images and one of the third deformed fifth grid images, and the step of establishing the texture mapping figure comprises:

superimposing the first deformed second grid images onto the texture blocks of the left texture figure;

superimposing the first deformed third grid images onto the texture blocks of the right texture figure;

superimposing the first deformed fifth grid images onto the texture blocks of the central texture figure;

blending the second deformed second grid images and the second deformed fifth grid images, corresponding to the texture blocks of the first blended texture figure, to form a sixth grid image according to a third weight and a fourth weight of each texture block in the first blended texture figure;

blending the second deformed third grid images and the third deformed fifth grid images, corresponding to the texture blocks of the second blended texture figure, to form a seventh grid image according to a fifth weight and a sixth weight of each texture block in the second blended texture figure;

superimposing the sixth grid images onto the texture blocks of the first blended texture figure; and superimposing the seventh grid images onto the texture blocks of the second blended texture figure.

8. The three-dimensional head portrait generating method according to claim 1, further comprising:

projecting radiant light onto a user's face by a projection unit;

sensing reflected light corresponding to the radiant light and reflected from the user's face by a sensing unit; and obtaining the front face information according to the reflected light.

9. An electronic device, comprising:

an image capture unit, capturing a left face image and a right face image; and a processing unit, establishing a three-dimensional head portrait model with a plurality of feature points according to front face information by a Delaunay Triangulation technology, wherein the feature points form a plurality of first grids on the three-dimensional head portrait model, the feature points are taken as vertexes of the first grids to form the plurality of first grids with triangular shape, the processing unit maps a first part of the feature points of the three-dimensional head portrait model to the left face image to form a plurality of second grids on the left face image, the processing unit maps a second part of the feature points of the three-dimensional head portrait model to the right face image to form a plurality of third grids on the right face image, and the processing unit combines the left face image and the right face image onto the three-dimensional head portrait model according to a correspondence between the first grids, the second grids and the third grids, to generate a three-dimensional head portrait;

wherein the feature points included by each of the second grids is the same as the feature points included by the corresponding first grid, and the feature points included by each of the third grids is the same as the feature points included by the corresponding first grid.

10. The electronic device according to claim 9, wherein the processing unit performs following steps:

decomposing the left face image into a plurality of second grid images according to the second grids decomposing the right face image into a plurality of third grid images according to the third grids;

deforming the second grid images according to the first grids corresponding to the second grids;

deforming the third grid images according to the first grids corresponding to the third grids, establishing a texture mapping figure according to the deformed second grid images and the deformed third grid images; and superimposing the texture mapping figure onto the three-dimensional head portrait model to generate the three-dimensional head portrait.

11. The electronic device according to claim 10, wherein the texture mapping figure has a plurality of texture blocks, the texture mapping figure comprises a left texture figure, a central texture figure and a right texture figure connected in sequence, the deformed second grid images are divided into first deformed second grid images and second deformed second grid images, the deformed third grid images are divided into first deformed third grid images and second deformed third grid images, and each texture block of the central texture figure corresponds to one of the second deformed second grid images and one of the second deformed third grid images, wherein the processing unit further performs following steps:

superimposing the first deformed second grid images onto the texture blocks of the left texture figure;

superimposing the first deformed third grid images onto the texture blocks of the right texture figure;

blending the second deformed second grid images and the second deformed third grid images, corresponding to the texture blocks of the central texture figure, to form a plurality of fourth grid images according to a first weight and a second weight of each texture block in the central texture figure; and superimposing the fourth grid image onto the texture blocks of the central texture figure.

12. The electronic device according to claim 11, wherein a total value of the first weight and the second weight is 1.

13. The electronic device according to claim 9, wherein the image capture unit further captures a front face image, the processing unit maps a third part of the feature points of the three-dimensional head portrait model to the front face image to form a plurality of fifth grids on the front face image, and superimposes the left face image, the right face image and the front face image onto the three-dimensional head portrait model according to a correspondence among the first grids, the second grids, the third grids and the fifth grids, to generate a three-dimensional head portrait.

14. The electronic device according to claim 13, wherein the processing unit performs following steps:

decomposing the left face image into a plurality of second grid images according to the second grids;

decomposing the right face image into a plurality of third grid images according to the third grids;

decomposing the front face image into a plurality of fifth grid images according to the fifth grids;

deforming the second grid images according to the first grids corresponding to the second grids;

deforming the third grid images according to the first grids corresponding to the third grids;

deforming the fifth grid images according to the first grids corresponding to the fifth grids;

establishing a texture mapping figure according to the deformed second grid images, the deformed third grid images and the deformed fifth grid images; and superimposing the texture mapping figure onto the three-dimensional head portrait model to generate the three-dimensional head portrait.

15. The electronic device according to claim 14, wherein the texture mapping figure has a plurality of texture blocks, the texture mapping figure comprises a left texture figure, a first blended texture figure, a central texture figure, a second blended texture figure and a right texture figure connected in sequence, the deformed second grid images are divided into first deformed second grid images and second deformed second grid images, the deformed third grid images are divided into first deformed third grid images and second deformed third grid images, the deformed fifth grid images are divided into first deformed fifth grid images, second deformed fifth grid images and third deformed fifth grid images, each texture block of the first blended texture figure corresponds to one of the second deformed second grid images and one of the second deformed fifth grid images, and each texture block of the second blended texture figure corresponds to one of the second deformed third grid images and one of the third deformed fifth grid images, wherein the processing unit further performs following steps:

superimposing the first deformed second grid images onto the texture blocks of the left texture figure;

superimposing the first deformed third grid images onto the texture blocks of the right texture figure;

superimposing the first deformed fifth grid images onto the texture blocks of the central texture figure;

blending the second deformed second grid images and the second deformed fifth grid images, corresponding to the texture blocks of the first blended texture figure, to form a sixth grid image according to a third weight and a fourth weight of each texture block in the first blended texture figure;

blending the second deformed third grid images and the third deformed fifth grid images, corresponding to the texture blocks of the second blended texture figure, to form a seventh grid image according to a fifth weight and a sixth weight of each texture block in the second blended texture figure;

superimposing the sixth grid images onto the texture blocks of the first blended texture figure; and superimposing the seventh grid images onto the texture blocks of the second blended texture figure.

16. The electronic device according to claim 9, further comprising:

a projection unit, projecting radiant light onto a user's face; and a sensing unit, sensing reflected light corresponding to the radiant light and reflected from the user's face, wherein the processing unit obtains the front face information according to the reflected light.

17. A non-transitory computer readable recording medium device, storing a plurality of program codes, wherein when the program codes are loaded on an electronic device, the electronic device performs the following steps:

establishing a three-dimensional head portrait model with a plurality of feature points according to front face information by a Delaunay Triangulation technology, wherein the feature points form a plurality of first grids on the three-dimensional head portrait model, the feature points are taken as vertexes of the first grids to form the plurality of first grids with triangular shape;

mapping a first part of the feature points of the three-dimensional head portrait model to a left face image to form a plurality of second grids on the left face image;

mapping a second part of the feature points of the three-dimensional head portrait model to a right face image to form a plurality of third grids on the right face image; and superimposing the left face image and the right face image onto the three-dimensional head portrait model according to a correspondence among the first grids, the second grids and the third grids, to generate a three-dimensional head portrait;

wherein the feature points included by each of the second grids is the same as the feature points included by the corresponding first grid, and the feature points included by each of the third grids is the same as the feature points included by the corresponding first grid.

* * * * *